United States Patent [19]
Beck et al.

[11] Patent Number: 5,595,799
[45] Date of Patent: *Jan. 21, 1997

[54] COINJECTION MOLDING OF DECORATIVE PREFORMS AND CONTAINERS PRODUCED FROM SUCH PREFORMS

[75] Inventors: Martin H. Beck, Amherst; Robert Caldicott, Nashua; John H. Muszynski, Auburn, all of N.H.

[73] Assignee: DTL Technology Limited Partnership, Amherst, N.H.

[*] Notice: The term of this patent shall not extend beyond the expiration date of Pat. No. 5,221,507.

[21] Appl. No.: 572,596

[22] Filed: Dec. 14, 1995

[51] Int. Cl.⁶ ........................................ B32B 9/00
[52] U.S. Cl. .................. 428/35.7; 428/79; 428/120; 428/121; 428/122; 428/126; 428/192; 428/412; 428/542.8; 264/255; 264/297.2; 264/328.4; 264/328.8; 264/328.14; 264/328.15; 264/328.16; 264/328.19; 264/401; 264/513; 425/130; 425/560
[58] Field of Search .............. 428/120, 79, 122, 428/121, 35.7, 126, 131, 195, 36.7, 542.8, 192, 60, 412; 264/255, 297.2, 513, 401, 328.4, 328.19, 328.16, 328.15, 328.14, 328.8; 425/130, 560

[56] References Cited

U.S. PATENT DOCUMENTS

| | | | |
|---|---|---|---|
| 4,550,043 | 10/1985 | Beck | 428/36 |
| 4,863,665 | 9/1989 | Schad et al. | 264/255 |
| 4,931,234 | 6/1990 | Schad et al. | 264/40.1 |
| 5,040,963 | 8/1991 | Beck et al. | 425/130 |
| 5,143,733 | 9/1992 | Von Buren et al. | 425/130 |
| 5,221,507 | 6/1993 | Beck et al. | 264/255 |

*Primary Examiner*—Patrick Ryan
*Assistant Examiner*—Abraham Bahta
*Attorney, Agent, or Firm*—Davis and Bujold

[57] ABSTRACT

A process for injection molding a multi-colored article in an injection mold, in which a) a desired initial quantity of a first-colored material is metered to a first desired portion of the cavity; b) a desired quantity of a second-colored material is supplied to the cavity, contiguously with the first-colored material, and is metered to a second desired portion of the cavity. The location of the first and second desired portions within in the cavity being controlled by providing the first and second-colored materials with appropriate melt viscosities and controlling the temperature and rate of supply of the first and second-colored materials. A multi-colored preform formed by the process that is suitable for blow molding a multi-colored container, and a multi-colored container blow molded from such a preform are also provided.

24 Claims, 5 Drawing Sheets

COINJECTION MOLDING OF DECORATIVE PREFORMS AND CONTAINERS PRODUCED FROM SUCH PREFORMS

FIELD OF THE INVENTION

This invention relates to coinjection molding of decorative (e.g. multi-colored) articles, such as preforms for use in the blow molding of decorative containers.

It is to be appreciated that the terminology of first and second materials, as used herein, is intended to cover at least two differently colored materials, preferably light-colored (or clear) and dark-colored (or black), which are contiguously supplied, by a coinjection process, to an injection mold, it being entirely possible that one or more other materials may, by this process, be sequentially or simultaneously, contiguously supplied before, between, after, or at the same time as the first and second materials. As used herein, clear and black are to be construed as colors.

BACKGROUND OF THE INVENTION

Coinjection molding of preforms for use in blow molding is known in the prior art. The formation of such containers is described in detail, for example, in Applicant's U.S. Pat. No. 4,550,043. Both single material preforms and multi-material preforms have been injection molded in prior art multi-cavity molds, which may have as many as 96 cavities, into which the material, from which the preforms are to be formed, is injected simultaneously thereby to simultaneously produce a preform in each of the cavities.

Figure 1:
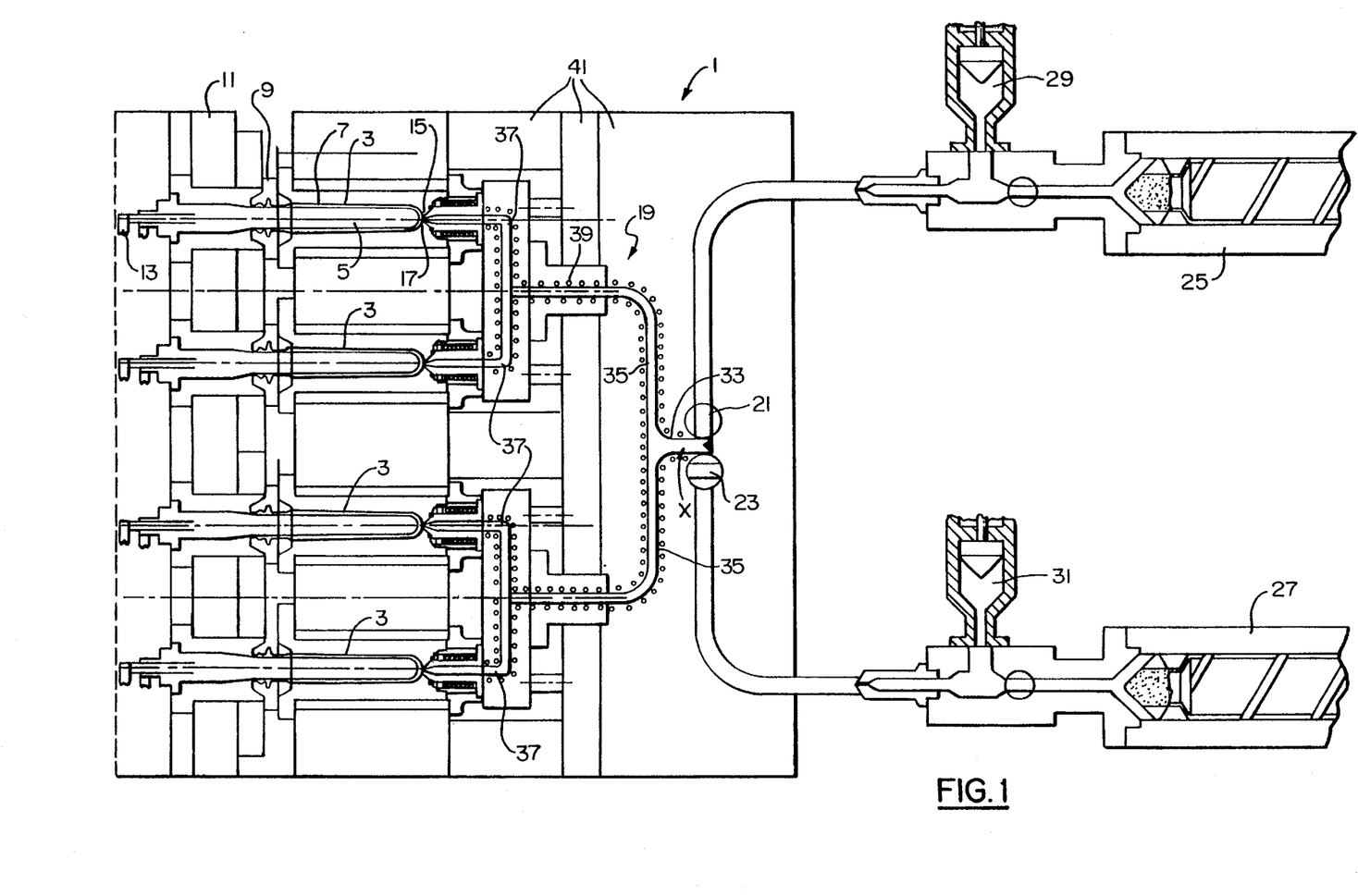
FIG. 1 is a diagrammatic cross-section of a multi-cavity sequential coinjection mold system according to the prior art.

FIG. 1 is a diagrammatic illustration of a prior art mold in which two different materials are sequentially and contiguously supplied to a plurality of cavities through a common manifold system. The manifold system of FIG. 1 and a process of using the system are disclosed in Applicant's U.S. Pat. Nos. 5,040,963 and 5,221,507. The prior art mold 1 illustrated in FIG. 1 defines a common manifold arrangement 19 to convey both of the materials, which will form the preform, to the cavities 3. It is known in such an arrangement to repeatedly divide the material flow, whereby the flow path 33, 35, 37 from the material inlet 33 of the mold 1 to each cavity 3 is identical, whereby each cavity 3 will receive an equal metered amount of material at substantially the same temperature and at substantially the same time as every other cavity 3.

Construction details of the mold 1, its manifold system 19, the heating means 39 and the insulating means 41, together with the cavity design 3, 7 and cooling arrangements for the core pins 5 and cavities 3, the split neck rings 9, etc., are considered to be conventional in this technology and will be readily apparent to those skilled in the art. Similarly the plasticizer barrels 25 and 27 and ram pots 29 and 31 are of conventional construction, as are the general engineering details of the diverter valves 21 and 23. Accordingly these matters will not be described in detail in this application.

Figure 2:
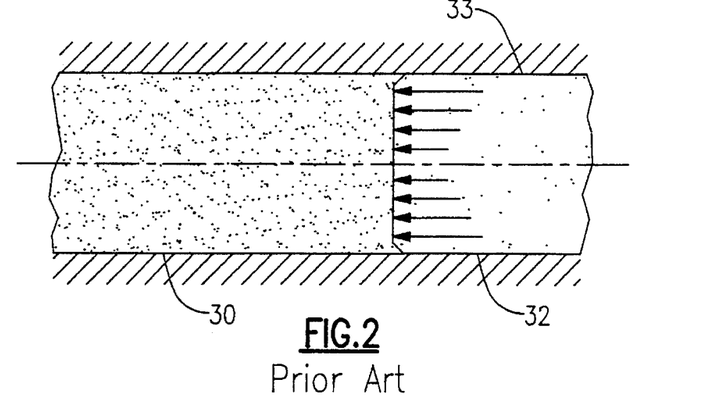
FIG. 2 diagrammatically illustrates a cross-section of the junction between two different molten materials being sequentially and contiguously injected into the cavities, the cross-section being taken immediately downstream of the diverter valves of the system illustrated in FIG. 1 at arrow "X"

With reference now to FIG. 2, there is diagrammatically illustrates an interface between a first molten material 30 and a second molten material 32 in hot runner 33 at X (See FIG. 1). For the sake of illustration, it may be assumed that the first molten material 30 is supplied from plasticizer barrel 25 and the second molten material 32 is supplied from plasticizer barrel 27. When the diverter valves 21 and 23 have been operated to change the supply of molten material from plasticizer barrel 25 and ram pot 29 to molten material from plasticizer barrel 27 and ram pot 31, the second molten material is supplied sequentially behind and contiguously with the first molten material. Since the two materials are supplied sequentially and contiguously, an interface, as illustrated in FIG. 2, is formed between the two materials as they travel through the hot runners. The hot runner 33 is maintained at approximately 500° F., and the frictional drag on the material is illustrated at the interface or melt front of the two materials.

The prior art injection molding techniques and manifold arrangements, however, have only been proposed for the production of preforms having multiple layers of different materials and have not been proposed for the molding of preforms having differently colored (including clear) areas for use in producing decorative containers. Until the recent invention, the process parameters for the injection of differently colored materials to produce multi-colored preforms and resulting containers were not understood.

SUMMARY OF THE INVENTION

Wherefore, it is an object of the present invention to provide a coinjection process suitable for the production of multi-colored preforms and resulting decorative containers.

The present invention provides a process for coinjection molding a multi-colored decorative article comprising the following steps. Metering an initial quantity of a molten first-colored material. Supplying the initial molten first-colored material through a supply gate in an injection mold cavity and into the cavity. Metering a quantity of a molten second-colored material. Supplying the molten second-colored material through the supply gate and into the cavity, contiguously with the initial first-colored material. Controlling the locations of the first and second-colored materials in the cavity, such that the initial first-colored material is supplied to at least a desired first portion of the cavity and the second-colored material is supplied to at least a desired second portion of the cavity, by providing the first and second-colored materials with desired melt viscosities, and controlling the melt temperatures and rates of supply of the first and second-colored materials.

The present invention also provides a process as set forth above, in which the molten second-colored material is supplied sequentially or simultaneously, as well as contiguously with the first-colored material.

The present invention also provides a multi-colored article produced by the above process.

The present invention also provides a multi-colored preform, suitable for blow molding a decorative container, produced by the above process, and to a decorative container blow molded from such a preform.

The present invention further provides a process for coinjection molding a multi-colored decorative article comprising the following steps. Metering an initial quantity of a molten first-colored portion of a material. Supplying the initial molten first-colored portion through a supply gate in an injection mold cavity and into the cavity. Metering a quantity of a molten second-colored portion of the material. Supplying the molten second-colored portion through the supply gate and into the cavity, contiguously with the initial first-colored portion. Controlling the locations of the first and second-colored portions of the material in the cavity, such that the initial first-colored portion of the material is supplied to at least a desired first portion of the cavity and the second-colored portion of the material is supplied to at least a desired second portion of the cavity, by providing the first and second-colored portions of the material with desired melt viscosities, and controlling the melt temperatures and rates of supply of the first and second-colored portions of the material.

BRIEF DESCRIPTION OF THE DRAWINGS

The invention will now be described, by way of example, with reference to the accompanying drawings, in which.

DETAILED DESCRIPTION OF THE INVENTION

Figure 3:
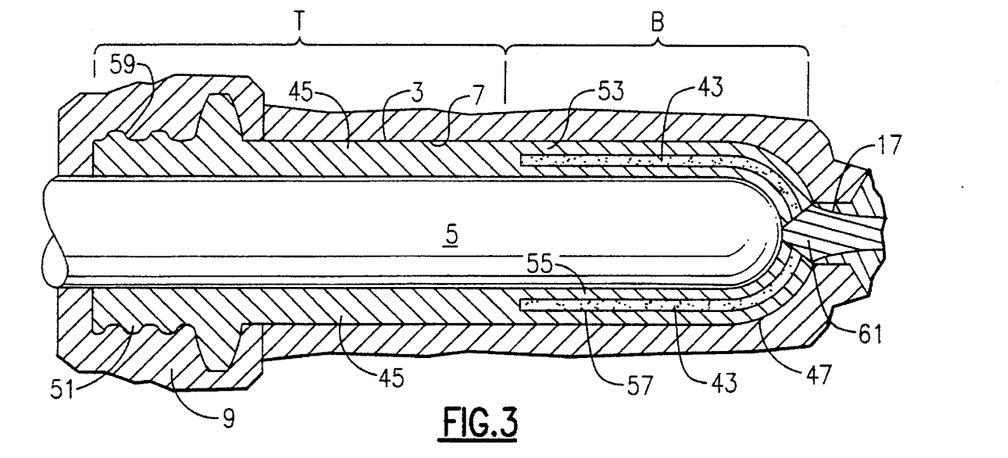
FIGS. 3 through 5 are diagrammatic cross-sections of one cavity of the mold system illustrated in FIG. 1, showing the distribution of materials in preforms formed therein according to first through third embodiments, respectively, of the invention.

With reference now to FIG. 3, the sequence of injection of molten materials for the formation of a multi-colored coinjected preform according to a first embodiment of the invention will be described. The preform and resulting container, according to the first embodiment, both have a dark colored proximate or bottom portion B and a light-colored (or clear) distal or top portion T.

At the beginning of an injection cycle according to the first embodiment, an initial metered quantity of molten light-colored PET 45 is supplied to cavity 3 to flow therethrough to neck forming portion 51. As the initial molten light-colored PET 45 flows through the cavity 3, it meets the relatively cool core pin 5 and relatively cool inner surface 7 of the cavity and freezes in contact therewith, forming exterior 53 and interior 55 surface layers of frozen light-colored PET 45 of the preform with a volume 57 of molten light-colored PET 45 flowing therebetween. The initial quantity of light-colored PET 45 is metered so that there is a sufficient quantity of light-colored PET 45 to completely fill the desired top portion T of the cavity 3 and to form only the exterior 53 and interior 55 surface layers in the desired bottom portion B.

When the metered quantity of molten light-colored PET 45 has been supplied to the cavity 3, a desired quantity of molten dark-colored PET 43 is supplied to the cavity 3. The molten dark-colored PET 43 is supplied sequentially and contiguously following the initial metered quantity of molten light-colored PET 45. Thus, an interface, similar to that illustrated in FIG. 2, exists between the initial molten light-colored PET 45 and the molten dark-colored PET 43. The metered quantity of molten dark-colored PET 43 contiguously follows the molten light-colored PET 45 through the gate 17, into the cavity 3 and through the volume 57, pushing the initial quantity of molten light-colored PET 45 before it. The molten dark-colored PET 43 is metered such that it substantially fills the volume 57 in the desired bottom portion B of the cavity only and pushes the molten light-colored PET 45 out of volume 57 and into the desired top portion T of the cavity. In this manner, the desired top portion T of the cavity is completely filled with light-colored PET 45 only.

The quantity of molten dark-colored PET 43 is also metered so that a next following final quantity of molten light-colored PET 45 will flow through gate 17 and fill a small void 61 adjacent the gate 17, in order to clear the hot runners and the gate 17 of molten dark-colored PET 43 in preparation for production of the next preform. Once the molten dark-colored PET 43 has been cleared from the hot runners and the gate 17, the multi-colored preforms are removed from the mold cavities 3 and the next injection cycle is commenced using the remaining metered quantity of molten light-colored PET 43, already present at the gates 17, as the initial metered quantity of molten light-colored PET 45.

The quantity of dark-colored PET 43 may alternatively be metered such that the dark-colored PET 43 completely fills the volume 57 and the initial quantity of light-colored PET 45 for producing the next preform is present at the gate 17, but does not enter the cavity. In this case, there is no final quantity of light colored PET 45 and there is no small volume 61 filled by a final quantity of light colored PET 45.

In the bottom portion B of the preform and resulting container according to the first embodiment, the dark-colored PET 43 filling the volume 57 masks the light-colored PET 45 defining the interior 55 and exterior 53 surface layers. The bottom portion B is therefore seen as dark-colored.

Figure 4:
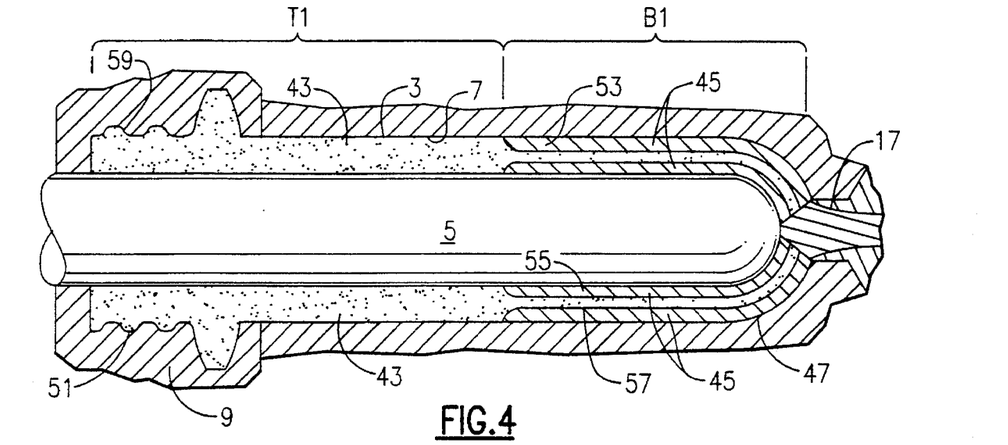

A second embodiment of the invention will now be described with reference to FIG. 4. The preform and resulting container according the second embodiment have a dark-colored distal or top portion T1 and a light-colored proximate or bottom portion B1. The dark-colored material and the light-colored material are again preferably formed of the same resin, preferably PET, but they are deliberately made dissimilar in melt viscosity and flow characteristics via process conditions and additives. In particular, the dark-colored PET 43 is provided with a significantly lower melt viscosity, and is supplied at a higher melt temperature and a faster rate than the light-colored PET 45.

The same injection sequence used in the first embodiment, i.e. light-dark-light colored molten PET, is used to achieve a preform according to the second embodiment. The metered quantity of the initial molten light-colored PET 45, however, is reduced compared to the metered quantity of the initial molten light-colored PET in the first embodiment. Moreover, the initial molten light-colored PET 45 is, in the preferred process, injected at a relatively slow rate, preferably 3–50% slower than when filling the entire cavity 3 with a single material in the conventional fashion.

The initial molten light-colored PET 45 is injected at a relatively slow rate to ensure that a substantial quantity of the initial molten light-colored PET 45 freezes to the relatively cool core pin 5 and the relatively cool inner surface 7 of the cavity to define interior 55 and exterior 53 layers of the preform with the volume 57 of molten material flowing therebetween, as previously described. Moreover, the desired quantity of the initial molten light-colored PET 45 is metered, so that there is only a sufficient quantity of molten light-colored PET 45 to form interior 55 and exterior 53 surface layers in the desired bottom portion B1 of the preform, as illustrated in FIG. 4.

When the metered quantity of initial molten light-colored PET 45 has been supplied to the cavity 3, a desired quantity of molten dark-colored PET 43 is sequentially and contiguously supplied to the cavity 3. The quantity of molten dark-colored PET 43 is injected at a relatively fast rate, preferably 3–50% faster than when filling the entire cavity 3 with a single material in the conventional fashion, and at a higher melt temperature than when filling the entire cavity with a single material in the conventional fashion.

The exterior 53 and interior 55 surface layers of light-colored PET 45 insulate the molten dark-colored PET 43 flowing in the volume 57 from the relatively cool core pin 7 and inner surface 7 of the cavity. Since the molten dark-colored PET 43 is made less viscous, supplied at a higher melt temperature, injected at a relatively fast rate, and insulated from the relatively cool core pin and cavity by the exterior 53 and interior 55 surface layers only, an insignificant quantity of the molten dark-colored PET 43 freezes to the frozen light-colored PET 45 which has formed the exterior 52 and interior 55 surface layers in the bottom portion B1 of the preform, while the bulk of the molten dark-colored PET 43 flows relatively easily over the frozen light-colored PET 53 and 55 in the bottom portion B1 to fill the top portion T1. The molten dark-colored PET 43 essentially "slides" through the volume 57, contiguously with the initial molten light colored PET 45, to fill the top portion T1 of the preform. The desired quantity of molten dark-colored PET 43 is metered such that there is a sufficient quantity of molten dark-colored PET 43 to fill the desired top portion T1 of the preform, but not the volume 57 in the desired bottom portion B1.

Once the metered quantity of molten dark-colored PET 43 has been supplied to the cavity 3, a final quantity of molten light-colored PET 45 is sequentially and contiguously supplied to the cavity 3. The final quantity of molten light-colored PET 45 fills volume 57, pushing substantially all of the molten dark-colored PET 43 out of volume 57 and into the desired top portion T1. Thus, a preform and resulting container that has a dark-colored top portion T1 and a light-colored bottom portion B1 is formed.

Despite the use of a lower melt viscosity, higher melt temperature and fast injection rate for the molten dark-colored PET 43, a relatively small, insignificant quantity of the molten dark-colored PET unavoidably freezes to the surfaces of the exterior 53 and interior 55 surface layers in volume 57. As a result, when the light-colored PET 45 is clear, the desired bottom portion B1 of the preform according to the second embodiment will be seen as light-colored, rather than clear. When the preform is blow molded into the desired decorative container, however, the walls of the preform are stretched and thinned to a large degree, for example, by a factor of twelve. After being stretched to such a large degree, the small quantity of dark-colored PET 43 is stretched so thin that it becomes substantially invisible to the naked eye, and the desired bottom portion of the resulting container is therefore seen as clear.

In order to produce a preform and resulting container having a light-colored top portion T1 and a dark-colored bottom portion B1 according to the second embodiment, the injection sequence is reversed, i.e. the injection sequence becomes dark-light-dark colored molten PET. In this manner the initial molten dark-colored PET 43 forms the exterior 53 and interior 55 surface layers in the bottom portion B1 only, the molten light-colored PET 45 flows through the volume 57 and fills the top portion T1, and the final quantity of molten dark-colored PET 43 fills the volume. The result is a preform in which the colors are reversed from those shown in FIG. 4.

If it is desired to blow mold a container having a dark-colored top portion T1 and a light-colored bottom portion B1 of the same color as the second embodiment, the preform may also be produced as follows. The quantity of dark-colored molten PET 43 is metered such the molten dark-colored PET 43 completely fills the top potion T1 and completely fills the volume 57 in the bottom portion, thereby eliminating the final quantity of molten light-colored PET 43. The resulting preform will be seen as a single dark color. However, after blow molding the preform into the desired container, due to the large degree of stretching of the preform discussed above, and providing the layer of dark-colored material in the volume 57 is thin enough, the dark-colored material in volume 57 will be stretched so much that the bottom portion B1 will be seen as light-colored.

Figure 5:
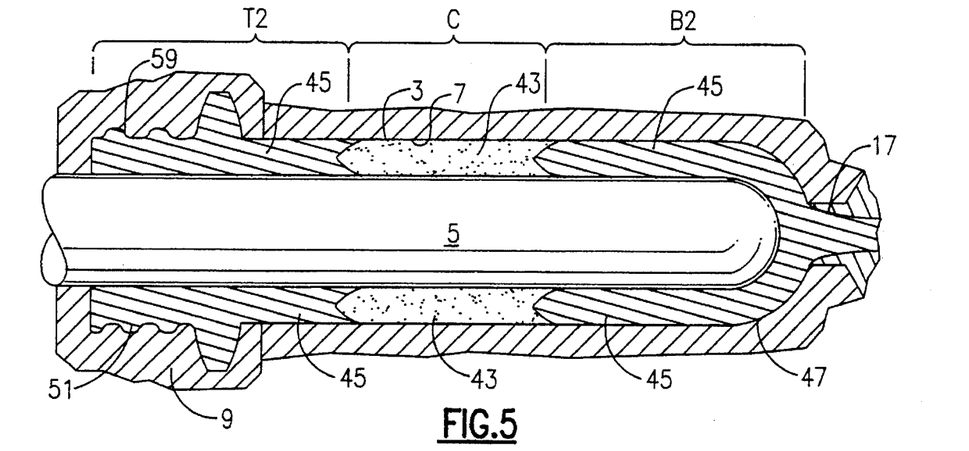

A third embodiment of the invention will now be described with reference to FIG. 5. The preform and resulting container according the third embodiment have a light-colored distal or top portion T2, a dark-colored central portion C, and a light-colored proximate or bottom portion B2. The dark-colored material and the light-colored material are again preferably formed of the same resin, preferably PET, both of which, however, are provided with a significantly lower melt viscosity, and supplied at a faster rate and a higher melt temperature, than when filling the entire cavity 3 with a single material in the conventional fashion.

A light-dark-light colored molten PET injection sequence is used to achieve a preform according to the third embodiment. The desired metered quantity of the initial molten light-colored PET 45, however, is provided with the lower melt viscosity, and is injected at the relatively high melt temperature and at the relatively high rate, to ensure that the initial molten light-colored PET 45 flows through the cavity 3, with only an insubstantial quantity of the initial molten light-colored PET 45 freezing to the relatively cool core pin 5 and surface 7 of the cavity. The temperature of the core pin 5 and the cavity 3 may be elevated above the conventional temperature to further ensure that an insignificant quantity of the initial molten light-colored PET 45 freezes thereto. The quantity of the initial molten light-colored PET 45 is metered so that only the desired top portion T2 of the preform is filled with light-colored PET 45, as illustrated in FIG. 5.

When the metered quantity of initial molten light-colored PET 45 has been supplied to the cavity 3, a metered quantity of molten dark-colored PET 43 is sequentially and contiguously supplied to the cavity 3. The quantity of molten dark-colored PET 43 is injected at the relatively fast rate and at the relatively high melt temperature, such that only an insubstantial quantity of the molten dark-colored PET 43 freezes in the bottom portion B3 of the preform. The quantity of molten dark-colored PET 43 is metered such that only a desired central portion C of the preform is filled with dark-colored PET 43.

Once the metered quantity of molten dark-colored PET 43 has been supplied to the cavity 3, the next metered quantity of final molten light-colored PET 45 is sequentially and contiguously supplied to the cavity 3. The quantity of final molten light-colored PET 45 may also be injected at the relatively fast rate and the relatively high melt temperature. The final quantity of molten light-colored PET 45 is metered such that the desired bottom portion B2 of the preform is filled with light-colored PET 45, at which point in time, the supply of molten PET is halted and the preform is cooled and then removed from the mold.

By injecting each desired metered quantity of molten dark and light-colored PET at the faster rate, the total manufacture time for producing a set of preforms is advantageously reduced by 3–50% than when filling the cavity 3 in the conventional manner. Given proper selection and control of the temperature of the cavity 3 and the core 5, however, the light and dark-colored PET 45, 43 may both be provided with a conventional melt viscosity, and be injected at a conventional rate and a relatively low or conventional melt temperature.

The injection sequence of the third embodiment may be reversed, i.e. dark-light-dark molten PET. If the sequence is reversed, the final quantity of the molten dark-colored PET 45 may be provided with a relatively low or conventional melt viscosity and be injected at a relatively slow or conventional rate.

Any desired plurality of dark bands separated by light bands may be formed in the preform according to the third embodiment. For example, an injection sequence of dark-light-dark-light-dark molten PET, would produce a preform and resulting container having the same sequence of colored bands of material. Likewise, any desired plurality of colors may be injected in any desired sequence. Three different colors A, B, C, (red, white and blue, for example), may be injected in any desired sequence to form a tri-colored container. The injection sequence would then be A-B-C-A, with the final quantity of color A serving as the initial quantity of color A when forming the next preform.

In addition banded two color preforms may be produced by the process of the third embodiment.

EXPERIMENT 1

Rheology tests using a parallel plate rheometer were performed on three samples of molten PET containing varying loads of pigment (holcobatch blue 932183). The three molten PET samples tested were, a clear control sample A, a three percent pigment load B, and a twelve percent pigment load C. The space between the plates was filled with the three molten PET samples, and the plates were rotated relative to each other at dynamic testing frequencies providing a shear rate ranging from 1 to 100 (rad/s) at a set temperature of 262° C. for each sample. The viscosity of each sample was measured throughout the full range of dynamic testing frequencies and resulting shear rates. While shear rate is increased in the plasticizer by way of appropriate control of processing conditions, in the present invention increased shear rate may be created by increasing the injection rate of molten PET into the cavity.

Figure 6:
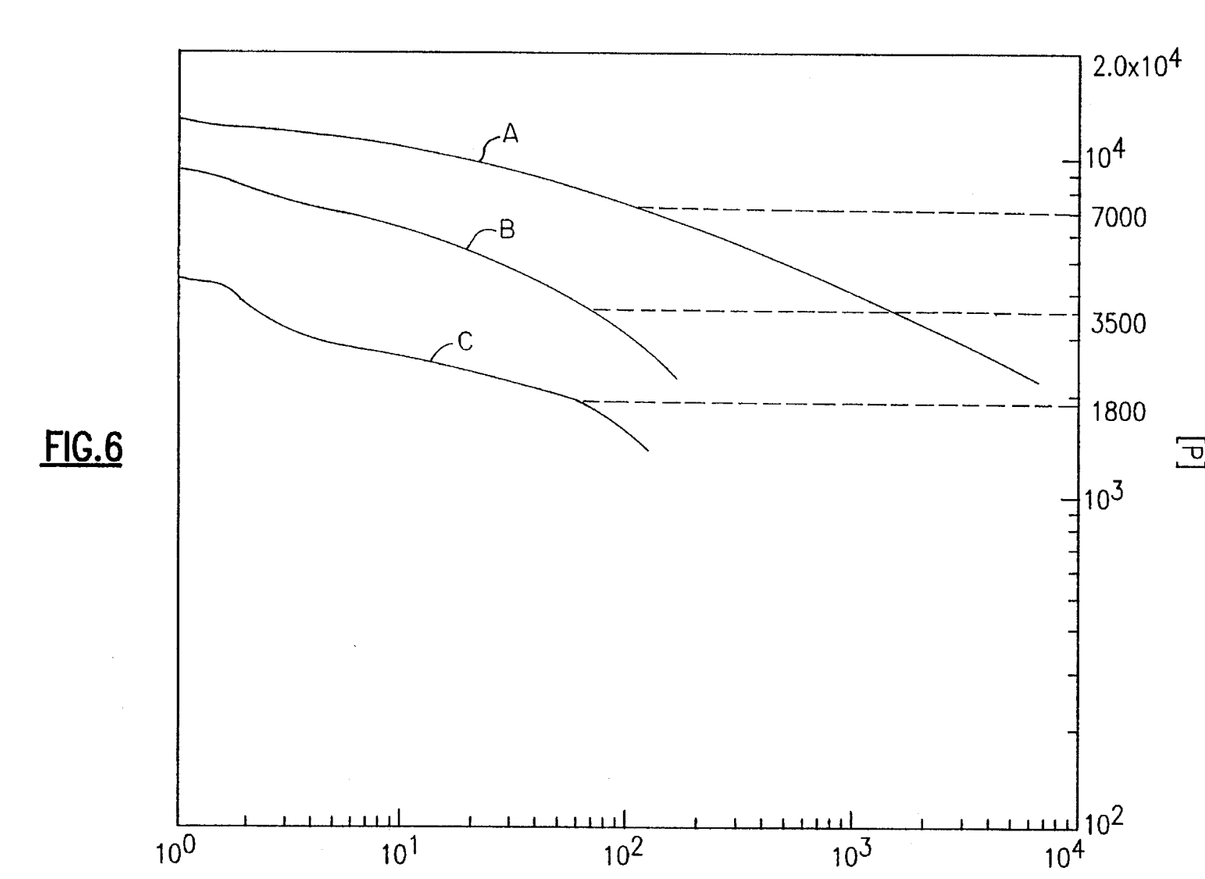
FIG. 6 is a graph plotting viscosity against shear rate for three samples of PET with varying pigment loads.

The results of Experiment 1 illustrate the rheological trends which take place as the amount of pigment in the PET is increase. FIG. 6 is a plot of the viscosity of the three samples A, B, and C of PET over the shear rate (rad/s). It can be seen from FIG. 7 that the viscosity in poise of the PET, indicated on the Y-axis in FIG. 6, decreases with increased pigment loading. For example, at a randomly chosen shear rate of 62 rad/s, indicated on the X-axis, the viscosities of the three test samples A, B and C were 7,000, 3,500, and 1,800 poise, respectively. This holds true throughout the dynamic testing shear rate range of 1 to 100 rad/s, and can be assumed to follow that same trend at higher shear rates.

EXPERIMENT 2

In a second experiment, the viscosities of three different test samples of molten PET, a clear D, a one percent pigment load E, and a three percent pigment load F, were tested at a fixed shear rate of 6 rad/s, while the temperature was decreased from 270° C. to 225° C.

Figure 7:
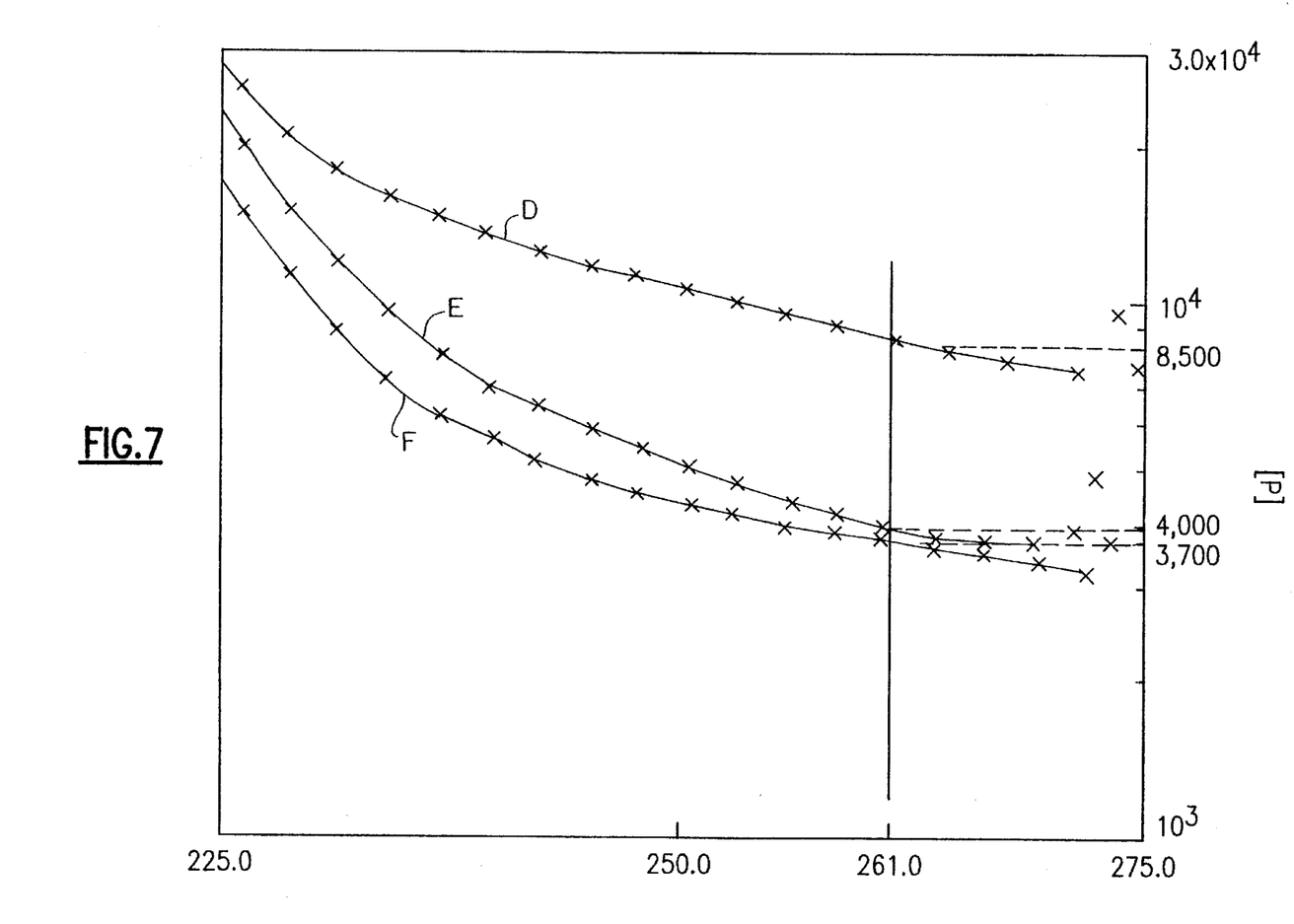
FIG. 7 is a graph plotting viscosity against melt temperature for three samples of PET with varying pigment loads.

The viscosities of the three sample D, E and F are plotted over the injection temperature of the samples in FIG. 7. As can be seen in FIG. 7, as the temperature increases, the viscosities of the loaded samples E and F decreases significantly compared to the non-loaded clear sample D.

In conclusion, the viscosity of molten PET decreases with increased pigment loading, as illustrated in FIG. 6. Moreover, the difference between the viscosities of the relatively heavily pigment loaded samples E and F and the that of non-loaded sample D increases as the melt temperature increases, as illustrated by FIG. 7. It is particularly noted that the viscosity of the loaded samples B, C, E and F are nearly half that of the clear PET samples A and D, in the normal pigment loading range of 0 to 3% within the conventional injection temperature range of 240° C. and above.

A molten PET that is heavily loaded with pigment has a lower viscosity than a molten PET with a zero to light pigment loading. Thus, the molten heavily loaded PET according to the invention is provided with a relatively low viscosity compared to a molten lightly loaded PET, simply by virtue of its relatively high pigment load. Molten heavily loaded PET will slide relatively easily through the cavity 3 or volume 57 with no significant freezing, without requiring any additives or special process conditions to decrease its viscosity. On the other hand, when it is desired to decrease the viscosity of the molten lightly pigment loaded PET, it is necessary to add well known additives to, increase melt temperature of and/or increase shear rate of the molten lightly loaded PET. When desired, the difference in viscosity between a molten heavily loaded PET and a molten lightly loaded PET can be increased by increasing the temperature and/or the shear rate of the molten heavily loaded PET. Increasing the temperature and/or shear rate of the molten heavily loaded PET also helps prevent the molten heavily loaded PET from freezing to the inner walls of the cavity or volume 57.

The prior art multi-cavity mold 1 and manifold system 19 for the sequential coinjection molding of preforms illustrated in FIG. 1 is a preferred system for producing preforms for use in blow molding decorative containers according to the invention. However, other known coinjection molding systems having a variety manifold arrangements are capable of contiguously injecting two different materials into a single, or plurality of mold cavities and may be employed according to the present invention. For example, coinjection systems having multiple hot runner manifolds that contain a hot runner system for each of a plurality of different materials to be supplied to the cavities are suitable for practicing the present invention.

Some of these multiple hot runner systems have a valve at the gate 17 of each of the cavities 3 for controlling the supply of the different materials, while others have concentric supply gates at each of the cavities. When using a multiple manifold system having concentric supply gates, the differently-colored materials may be supplied simultaneously and contiguously and/or sequentially and contiguously to the cavities. For example, a preform according to the first embodiment, see FIG. 3, may be produced using concentric supply gates by first supplying a first portion of the initial metered quantity of light-colored PET 45, sufficient to fill the top portion T, through the outer concentric gate. Through the use of appropriately designed concentric supply gates, the metered quantity of dark-colored PET 43 and the remaining portion of the initial light-colored PET 45 may then be supplied simultaneously and continuously with each other in order to form the bottom portion B.

Further process of the present invention may be practiced using a system that supplies a single material through a single manifold system, the differently colored materials being created in such a single material, single manifold system by mixing desired quantities of differently colored pigments into the material before or as the material enters the manifold system, as required, to create metered portions of the material that are differently colored.

It is to be appreciated that the first and second materials that are used to form the multi-colored articles of the instant invention, can be manufactured from two or more materials of different melt viscosities. Melt viscosity differences of approximately ±100%, or even more, are possible. In addition, the temperature sensitivities and the coefficients of drag of the molten resin materials used to mold the multi-colored article are other important factors to consider in ensuring that the boundary interface between two adjacent molten resin materials remains intact and in ensuring that the molten materials slide through and/or freeze to the cavity 3 and/or volume 57 as desired.

The multi-colored article can be formed from three or more separate, sequentially injected materials or one of the materials can be a blend of two or more resin materials, e.g. PET and polyethylene naphathalate (PEN). PEN is a high barrier resin that would be useful in achieving a longer shelf life of a container which is manufactured according to the invention.

Figure 8:
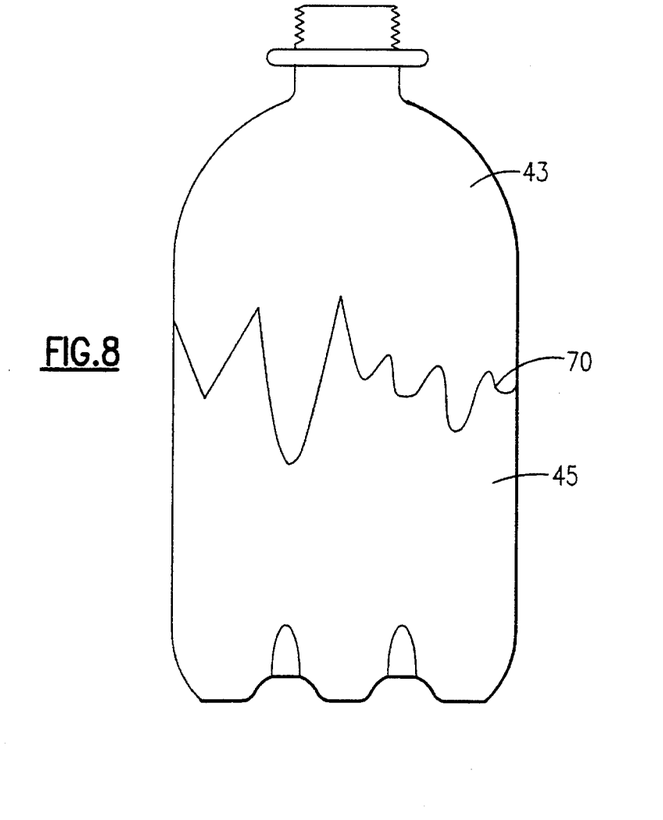
FIG. 8 is a diagrammatic elevation of a decorative bottle blow molded from a preform according to the invention.

In the multi-colored preforms and resulting containers produced by the present invention, the boundaries 70 between the dark 43 and light-colored PET 45 are wavy, not straight, as diagrammatically illustrated in a two-tone bottle in FIG. 8. A container having a unique and decorative appearance is therefore produced by the present invention.

The process of the present invention may by used to produce articles other than preforms suitable for blow molding decorative containers. The article produced in the cavity 3 may be a decorative hollow article, such as a cap or closure for spray cans, for example, with no need for a subsequent blow molding operation. In which case, the cavity is defined by male and female mold parts. Moreover, the article does not have to be hollow. The present invention may be employed to produce decorative thin discs or saucers that are planar, bowl shaped, wavy or any other desired configuration.

We claim:

1. A process for coinjection molding a multi-colored decorative article comprising the steps of:
   a) metering an initial quantity of a molten first-colored material;
   b) supplying the initial molten first-colored material through a supply gate in an injection mold cavity and into the cavity;
   c) metering a quantity of molten second-colored material;
   d) supplying the molten second-colored material through the supply gate and into the cavity, contiguously with the initial first-colored material;
   e) controlling the locations of the first and second-colored materials in the cavity, such that the initial first-colored material is supplied to at least a desired first portion of the cavity and the second-colored material is supplied to at least a desired second portion of the cavity, by providing the first and second-colored materials with desired melt viscosities, and controlling the melt temperatures and rates of supply of the first and second-colored materials.

2. A process according to claim 1, wherein the article is a multi-colored preform suitable for blow molding a decorative container, and further comprising the steps of:
   providing a said injection mold cavity having a core pin therein to define the preform between in inner surface of the cavity and an outer surface of the core pin; and
   steps b) and d), respectively, comprise supplying the first and second-colored material through a gate centrally located at one end of the cavity.

3. A process according to claim 2, wherein step e) comprises providing the first-colored material with a first melt viscosity and supplying the initial first-colored material at a first rate, such that, as said first-colored material enters the cavity, the initial first-colored material contacts and freezes to the inner surface of the cavity and the outer surface of the core pin, respectively forming exterior and interior surface layers of the preform, with a volume of molten first-colored material being defined between the outer surface layers.

4. A process according to claim 3, wherein:
   step a) comprises, metering the initial quantity of first-colored material, such that the initial first-colored material forms the exterior and interior surface layers, defining the volume therebetween, in only a proximate portion of the cavity adjacent the gate, leaving a distal portion of the cavity remote from the gate void of material.

5. A process according to claim 4, wherein:
   step c) comprises, metering the second-colored material, such that there is a sufficient quantity of the second-colored material to completely fill the distal portion of the cavity only;
   step d) comprises supplying the second-colored material sequentially and contiguously following the initial first-colored material; and
   step e) comprises, providing the second-colored material with a second melt viscosity, lower than the first melt viscosity, and injecting the metered quantity of second-colored material at a second rate, faster than the first rate, such that the second-colored material passes through the volume and fills the distal portion of the cavity.

6. A process according to claim 5, further comprising the steps of:
   metering a final quantity of the molten first-colored material, such that there is a sufficient final quantity of the first-colored material to fill the volume; and
   supplying the final quantity of the first-colored material to the cavity sequentially and contiguously following the metered quantity of second-colored material, such that the final quantity of first-colored material fills the volume, pushing substantially all of the second-colored material out of the volume and into the distal portion of the cavity.

7. A process according to claim 6, comprising providing a molten relatively light-colored material as the first-colored material and providing a molten relatively dark-colored material, compared to the relatively light-colored material, as the second-colored material.

8. A process according to claim 6, comprising providing a molten relatively dark-colored material as the first-colored material and providing a molten relatively light-colored material, compared to the relatively dark-colored material, as the second-colored material.

9. A process according to claim 4, wherein:

step c) comprises, metering the second-colored material, such that there is a sufficient quantity of the second-colored material to fill the distal portion of the cavity and to fill the volume;

step d) comprises supplying the second-colored material sequentially and contiguously following the initial first-colored material, such that the second-colored material fills the distal portion and the volume.

10. A process according to claim 9, comprising providing a molten relatively light-colored material as the first-colored material and providing a molten relatively dark-colored material, compared to the relatively light-colored material, as the second-colored material.

11. A process according to claim 9, comprising providing a molten relatively dark-colored material as the first-colored material and providing a molten relatively light-colored material, compared to the relatively dark-colored material, as the second-colored material.

12. A process according to claim 3, comprising:

providing a molten relatively dark-colored material as the first-colored material and providing a molten relatively light-colored material, compared to the relatively dark-colored material, as the second-colored material;

step a) comprises, metering the initial light-colored material, such that the initial quantity of the light-colored material forms the exterior and interior surface layers, defining the volume therebetween, in a proximate portion of the cavity, adjacent the path, and completely fills a distal portion of the cavity remote from the path;

step c) comprises, metering the dark-colored material, such that there is a sufficient quantity of the dark-colored material to substantially fill the volume; and step d) comprises supplying the dark-colored material sequentially and contiguously following the initial light-colored material, such that the second-colored material substantially fills the volume.

13. A process according to claim 12, further comprising the step of supplying a final quantity of the molten light-colored material to the cavity, and metering the final quantity of light-colored material such that the final quantity of light colored-material fills a small void adjacent the path and clears the path of dark-colored material in preparation for forming a next said article in the cavity.

14. A process according to claim 2, wherein step e) comprises the steps of providing the first-colored material and the second-colored material with a melt viscosity and supplying the first-colored material and the second-colored material at a rate, such that, as the first and second-colored materials enter the cavity, the materials flow through the cavity, with an insubstantial amount of the materials freezing to the inner surface of the cavity and the other surface of the core, and fill the cavity from a distal end remote from the path, towards a proximate end adjacent the path.

15. A process according to claim 14, wherein:

step a) comprises, metering the initial quantity of the first-colored material, such that the first-colored material to fills a distal portion of the cavity remote from the path only;

step c) comprises, metering the second-colored material, such that there is sufficient quantity of the second-colored material to fill at least a central portion of the cavity, adjacent the distal portion and between the distal portion and the path; and step d) comprises supplying the second-colored material sequentially and contiguously following the initial first-colored material, such that the second-colored material substantially fills the central portion.

16. A process according to claim 15, wherein:

step a) comprises, metering the second-colored material, such that the second-colored material substantially fills the proximate portion of the cavity.

17. A process according to claim 16, further comprising the step of:

supplying a final quantity of first-colored material to the cavity, and metering the final quantity of first-colored material such that the first-colored material fills a small void adjacent the path and clears the path of second-colored material in preparation for forming a next said article in the cavity.

18. A process according to claim 16, comprising providing a molten relatively light-colored material as the first-colored material and providing a molten relatively dark-colored material, compared to the relatively light-colored material, as the second-colored material.

19. A process according to claim 16, comprising providing a molten relatively dark-colored material as the first-colored material and providing a molten relatively light-colored material, compared to the relatively dark-colored material, as the second-colored material.

20. A process according to claim 2, comprising providing a desired plurality of differently colored materials;

providing each of the plurality of materials with a melt viscosity and supplying each of the plurality of materials a rate, such that, as the materials enter the cavity, the materials flow through the cavity, with an insubstantial amount of the materials freezing to the inner surface of the cavity and the other surface of the core, and fill the cavity from a distal end remote from the path, towards a proximate end adjacent the path;

metering desired quantities of each of the differently colored material in a desired sequence; and sequentially and contiguously supplying each of the quantities, one at a time, to the cavity in the desired sequence, thereby producing a preform having a corresponding desired plurality of differently colored bands in the desired sequence.

21. A process for coinjection molding a multi-colored decorative article comprising the steps of:

a) metering an initial quantity of a molten first-colored portion of a material;

b) supplying the initial molten first-colored portion through a supply gate in an injection mold cavity and into the cavity;

c) metering a quantity of molten second-colored portion of the material;

d) supplying the molten second-colored portion through the supply gate and into the cavity, contiguously with the initial first-colored portion;

e) controlling the locations of the first and second-colored portions of the material in the cavity, such that the initial first-colored portion of the material is supplied to at least a desired first portion of the cavity and the second-colored portion of the material is supplied to at least a desired second portion of the cavity, by providing the first and second-colored portions of the material with desired melt viscosities, and controlling the melt temperatures and rates of supply of the first and second-colored portions of the material.

22. A multi-colored article produced by a process comprising the steps of:

a) metering an initial quantity of a molten first-colored material;

b) supplying the initial molten first-colored material through a supply path to an injection mold cavity having a core therein defining the preform between an inner surface of the cavity and an outer surface of the core;

c) metering a quantity of molten second-colored material;

d) supplying the molten second-colored material through the supply path to the cavity, contiguously with the initial first-colored material;

e) controlling the location of the first and second-colored materials in the preform, such that the initial first-colored material is supplied to a desired first portion of the cavity only and the second-colored material is supplied to a desired second portion of the cavity only, by providing the first and second-colored materials with desired melt viscosities, and controlling the melt temperatures and rates of supply of the first and second-colored materials.

23. A multi-colored article produced by a process according to claim 22, wherein said article is a preform suitable for blow molding a decorative container.

24. A decorative container, blow molded from a multi-colored preform produced by a process comprising the steps of:

a) metering an initial quantity of a molten first-colored material;

b) supplying the initial molten first-colored material through a supply path to an injection mold cavity having a core therein defining the preform between an inner surface of the cavity and an outer surface of the core;

c) metering a quantity of molten second-colored material;

d) supplying the molten second-colored material through the supply path to the cavity, contiguously with the initial first-colored material;

e) controlling the location of the first and second-colored materials in the preform, such that the initial first-colored material is supplied to a desired first portion of the cavity only and the second-colored material is supplied to a desired second portion of the cavity only, by providing the first and second-colored materials with desired melt viscosities, and controlling the melt temperatures and rates of supply of the first and second-colored materials.

* * * * *